Feb. 18, 1969   F. G. WEIGHART   3,427,866
ULTRASONIC THICKNESS GAUGE AND FLOW DETECTOR
Filed Oct. 26, 1965

Fredrick G. Weighart,
INVENTOR.
BY
ATTORNEY.

United States Patent Office 3,427,866
Patented Feb. 18, 1969

3,427,866
ULTRASONIC THICKNESS GAUGE AND FLOW DETECTOR
Frederick Gordon Weighart, Sunset Cove, Brookfield, Conn. 06804
Filed Oct. 26, 1965, Ser. No. 505,289
U.S. Cl. 73—67.7     3 Claims
Int. Cl. G01h 9/24

ABSTRACT OF THE DISCLOSURE

Ultrasonic thickness measuring apparatus having separate transmitting and receiving transducers angled with respect to the entrant surface of the object so that their beam patterns overlap only at the rear surface of the object. A timing wave generator is initiated by delay means at a time corresponding to the entrance of a transmitted pulse into the front surface and cut off by reception of the echo from a further reflecting surface of the object.

---

Figure 1:
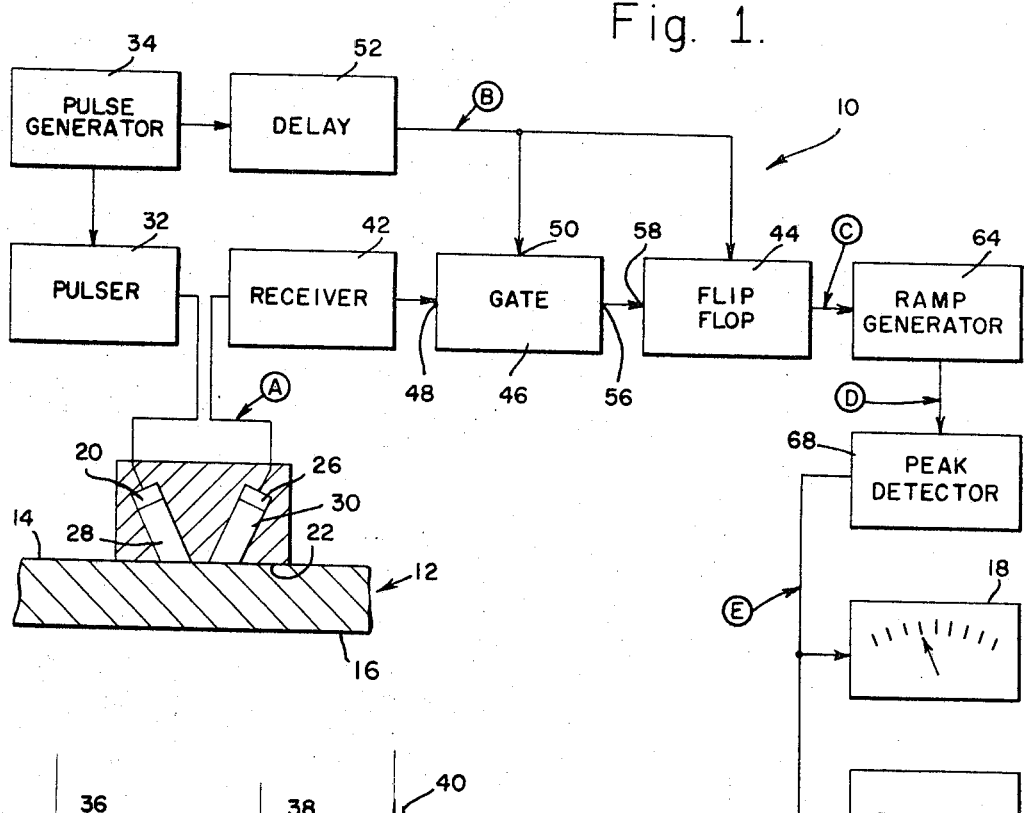

The present invention relates to nondestructive testing means and more particularly to ultrasonic nondestructive testing means.

One means of determining the internal integrity and/or thickness of a workpiece is to transmit ultrasonic energy into the workpiece and measure the amount of time required for the ultrasonic energy to travel from the front face of the workpiece to the rear face and return to the front face. In one form of tester a combination transducer is employed that is capable of both transmitting the energy and receiving the echoes. With an arrangement of this nature a very large signal is coupled into the receiver at the time of transmission. The receiver must be very sensitive to receive the small signals produced by the echoes. As a result it is "blocked" for a substantial period of time following the transmission of the initial pulse. It is virtually impossible to detect an echo occurring during the period the receiver is "blocked." As a result an ultrasonic system employing a single transducer cannot reliably detect targets that are very close to the transducer.

In order to overcome this difficulty and permit detecting targets close to the surface and/or measuring the thickness of thin workpieces, it has been proposed to separate the transducer from the workpiece and thereby introduce a time delay which is adequate to allow a recovery of the receiver before any echoes are received. The distance between the front surface and the target and/or thickness of the workpiece is then determined by measuring the time between the echo resulting from the interface formed at the entrant surface and the echo from the target or rear surface. Such an arrangement is not convenient since it normally requires immersing the transducer and workpiece in a liquid bath or providing some other large and bulky delay means. Also, it requires some form of gating means to detect the echo that is produced at the interface.

In order to overcome these disadvantages it has been proposed to provide a search unit having a pair of separate transducers that are acoustically isolated from each other. The search unit is placed directly on the surface of the workpiece whereby the first transducer transmits the ultrasonic energy directly into the workpiece and the other transducer receives the echoes. This arrangement permits a high degree of isolation between the receiver and the transmitted energy whereby the tendency for the receiver to be blocked is greatly reduced or eliminated. The receiver can thereby be very sensitive and also have a sufficiently short recovery time to sense echoes occurring immediately after the transmitted pulse. Heretofore the two transducers have been laterally spaced from each other so as to lay flat on the surface of the workpiece. Accordingly the range to the target or thickness is determined by measuring the time between the transmitted pulse and the echo. However, since the transducers have been parallel to each other the beam patterns have also been parallel and non-overlapping at close ranges. As a result it has been difficult to resolve targets that are not at a sufficient range to be in overlapping portions of the two beam patterns.

It has been proposed to overcome this difficulty by separating the transducers from the workpiece whereby the beam patterns overlap in the region of the rear surface of the workpiece. Since the receiving transducer is isolated from the transmitting transducer there is very little, if any, signal produced in the receiver corresponding to the transmission of the ultrasonic energy and/or the entrance of the energy into the workpiece. As a consequence it has been difficult to correlate the receiving times with the transmitting. Accordingly, heretofore it has been necessary to display the signals on a cathode ray oscilloscope and rely on an operator's ability to manually accurately interpret the display for each measurement.

The present invention provides means for overcoming the foregoing difficulties. More particularly, a small compact ultrasonic tester is provided for detecting and/or measuring the thicknesses of very thin workpieces. This is accomplished by providing an ultrasonic system having a search unit with a pair of acoustically isolated transducers which are adapted to be spaced from the surface of the workpiece with their beam patterns overlapping each other at a range that is very close to the front surface of the workpiece. Also, very simple means are provided for accurately and continuously measuring the flight time of the ultrasonic energy through the workpiece without any manual, time consuming interpretations by the operator.

In the single embodiment of the invention disclosed herein, a search unit is placed in direct contact with the surface of the workpiece. A pair of transducers are retained in the search unit at a predetermined fixed distance from the entrant surface. At the instant the transmission of the initial pulse occurs, time delay means are actuated to produce a reference signal. The reference signal is delayed by an interval equal to the flight time from the transmitting transducer to entrant surface whereby the signal occurs simultaneously with the entrance of the energy into the workpiece. The time between the reference pulse and the echo pulse is then measured to indicate the thickness.

Figure 2:
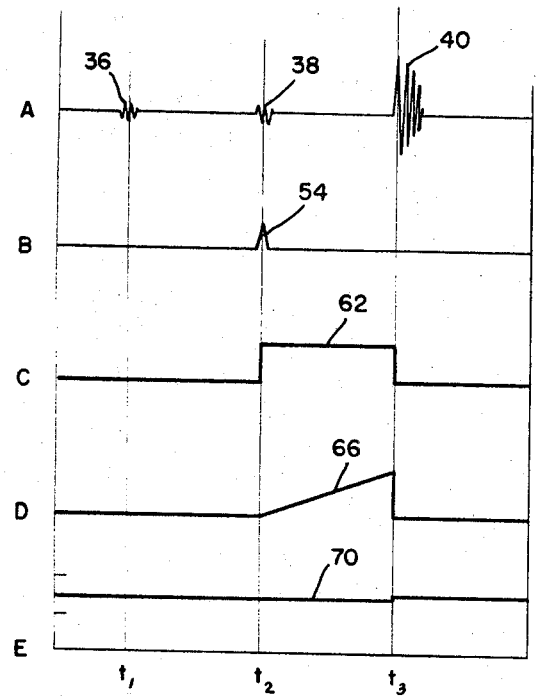

These and other features and advantages of the present invention will become readily apparent from the following detailed description of one operative embodiment thereof, particularly when taken in connection with the accompanying drawings wherein:

FIGURE 1 is a block diagram of a thickness gauge embodying one form of the present invention, and FIGURE 2 is a series of waveforms present in various portions of the thickness gauge in FIGURE 1.

Referring to the drawings in more detail the present invention is particularly adapted to be embodied in an ultrasonic nondestructive tester 10 for measuring the characteristics of a workpiece 12. Normally the workpiece 12 has a front or entrant surface 14 and a rear surface 16. Normally these two surfaces 14 and 16 are substantially uniformly spaced from each other and define the thickness of the workpiece 12. Although the tester 10 may be employed for measuring or determining a wide variety of characteristics of a workpiece 12 it is primarily useful in measuring the thickness of a workpiece 12 and/or variations in thickness. Although any suitable indicating means such as a cathode ray oscilloscope may be employed, in the present instance, a meter 18 is provided that is calibrated to continuously indicate thickness. If desired a recording indicator may also be provided to make a permanent record. It is to be noted that the tester 10 may also be employed for locating internal defects and their depth within the workpiece 12 by observing a localized, major variation in the measurement.

The tester 10 includes a search unit 20 which is adapted to be manually or mechanically manipulated so as to scan the workpiece 12. The search unit 20 includes a block of material having a smooth face 22 for being placed in intimate contact with the entrant surface 14.

A pair of transducers 24 and 26 are rigidly mounted inside of the search unit 20 so as to be carried therewith. The first transducer 24 is adapted to transmit pulses of ultrasonic energy whenever an appropriate electrical signal is applied thereto. This energy is propagated primarily along a beam pattern which extends into the workpiece 12 when the search unit 20 is seated thereon.

The other transducer 26 is adapted to produce electrical signals corresponding to ultrasonic energy incident thereon. This transducer 26 also has a beam pattern in which it is most sensitive. The search unit 20 positions this transducer 26 so that the echoes from the transmitted pulses reflected from within the workpiece 12 will lie within the beam pattern of the receiving transducer 26.

The search unit 20 preferably includes a material that highly attenuates ultrasonic energy. This insures the two transducers 24 and 26 being substantially completely isolated from each other. As a consequence even though a very large amount of energy may be radiated from the transducer 24 very little, if any, of this energy will be coupled directly into the transducer 26 and/or receiver.

In the event it is desired to measure the thicknesses of a relatively thin workpiece 12, the two transducers 24 and 26 may be angularly disposed relative to each other whereby the two beam patterns overlap each other at a range corresponding to that of the rear surface 16. This may be accomplished by positioning the two transducers 24 and 26 oblique to each other and to the face 22.

In addition, it has been found desirable to recess the transducers 24 and 26 into the search unit 20. In the present instance this is accomplished by providing a pair of passages 28 and 30 that extend inwardly from the face 22 of the search unit 20 at an angle to each other. It is to be noted that by increasing the lengths of the passages 28 and 30 the angle between the beam patterns may be reduced. This will be effective to increase the distance over which the patterns overlap each other and thereby increase the range of thicknesses that may be measured with any given search unit 20. It is also to be noted that by recessing the transducers 24 and 26 into the passages 28 and 30 in this manner, the transducers 24 and 26 may be substantially completely isolated from each other by the material in the search unit.

In order to insure an effective coupling between the transmitting and receiving transducers 24 and 26 and the entrant surface 14, the passages 28 and 30 may be filled with an acoustically transparent material, i.e., a material having a small amount of acoustical attenuation. Also the impedance of the material should be approximately equal to that of the workpiece 12.

A pulser 32 is electrically coupled to the transmitting transducer 24 for intermittently supplying triggering pulses thereto. Each time such a pulse is applied to the transducer 24, a pulse of ultrasonic energy is radiated from the transducer 24 and then coupled through the passage 28 and into the workpiece 12. The operation of the pulser 32 is controlled by a pulse generator 34 coupled to the pulser 32. The generator 34 provides a series of intermittent synchronizing pulses. These pulses are effective to control the rate at which the pulser 32 operates and also to synchronize the operation of the various portions of the tester 10.

Each time the generator 34 causes the pulser 32 to excite the transducer 24, a pulse or burst of ultrasonic energy is propagated through the material in the passage 28. If the face 22 of the search unit 20 is in contact with the workpiece 12, the energy will pass through the entrant surface 14 and into the workpiece 12. It is to be noted that the transfer of the energy through the surface 14 will be delayed from the initial transmission by the flight time of the energy through the passage 28.

At least a portion of the energy entering the workpiece 12 is reflected from the rear surface 16 and returned to the entrant surface 14. At least a portion of this returned energy is then coupled into the material in the passage 30 and carried to the receiving transducer 26 whereby an electrical signal is produced. The signal will normally be similar to that shown in FIGURE 2A. At time $t_1$, the pulse of ultrasonic energy is transmitted from the transducer 24. Since the two transducers 24 and 26 are completely isolated or substantially completely isolated there will be no pulse or a very small pulse such as at 36. After the energy traverses passage 28 it will pass through surface 14 at time $t_2$. Because of the isolation very little, if any, of this energy will reach transducer 26 and there will be no pulse, or a very small pulse, such as 38. The energy entering the workpiece 12 and reflected from the surface 16 will reach transducer 26 at time $t_3$ and produce a large pulse 40.

A receiver 42 is coupled to the transducer 26 to receive and/or detect the electrical signal of FIGURE 2A produced by the transducer 26. The resultant signal is very similar to the signal from the transducer 26 and pulses having a shape corresponding to the envelope of the transducer signal are produced.

As previously explained there will be no pulses or very small pulses, at times $t_1$ and $t_2$ corresponding to the transmission of the energy and its entrance into the workpiece 12.

However, there will be a large pulse at the time $t_3$ corresponding to the echo from the back surface 16. In order to determine the thickness of the workpiece 12 it is necessary to measure the time between the interface pulse (or the time $t_2$ at which the pulse should have occurred) and the echo pulse at time $t_3$. Heretofore, if such a measurement were to have been made it would have been necessary to produce a visual display on an oscilloscope and depend upon the operator to accurately interpret the display for each measurement.

The output from the receiver 42 is coupled to means for continuously and automatically measuring the foregoing time interval (i.e., $t_2-t_1$) without any manual operations or interpretations. In the present instance this includes a flip-flop 44 coupled to the receiver 42 by means of a gate 46 having a signal input 48 and a control input 50. The control input 50 is coupled to the pulse generator 32 by means of a delay circuit 52. Normally the gate 46 remains closed and prevents the passage of any of the received signals therethrough. However, each time the pulse generator 34 energizes the pulser 32 it will also actuate the delay circuit 52. The delay circuit 52 produces a reference signal 54 a predetermined time interval after the transmission of the ultrasonic energy. When this reference pulse 54 is applied to the control input 50, the gate 46 opens and remains open for a preselected time. This time normally terminates slightly before the next sync pulse at time $t_1$ from the pulse generator 34.

The output 56 from the gate 46 is connected to one one side 58 of the flip-flop 44 whereby the first echo pulse 40 occurring after the gate 46 opens will be coupled into the flip-flop 44 and cause the flip-flop to reset. The opposite side 60 of the flip-flop 44 is coupled to the delay circuit 52 and receives the reference pulse 54 therefrom. It may thus be seen that each time gate 46 opens, the reference pulse 54 will simultaneously set the flip-flop 44.

As a consequence, the output signal from the flip-flop 44 is a square wave 62 commencing simultaneously with the reference pulse 54 and terminating with the first echo pulse 40.

The duration of the delay from the delay circuit 52 is a fixed amount and is normally equal to the flight time (i.e., $t_2-t_1$) required for the transmitted energy to traverse the passage 28. Since the length of the passage 28 remains constant the reference pulse 54 will occur simultaneously with the entrance of the ultrasonic energy into the workpiece 12 when the search unit 20 is seated thereon. It will thus be seen that the reference pulse 54 forms an accurate interface signal and the time between the reference 54 and echo pulse 40 is an accurate function of the thickness of the workpiece. Accordingly, by measuring the duration of the square wave 62 from the flip-flop 44 the thickness of the workpiece may be determined and indicated on means such as meter 18.

The duration of the square wave 62 may be measured by any suitable means. In the present instance, a ramp generator 64 is coupled to the flip-flop 44 so as to respond to the square wave 62. The ramp generator 64 produces a saw tooth signal 66 which increases at a linear rate as long as the square wave 62 is present on the input of the generator 64. As a result the signal 66 reaches a peak which is a function of the time duration of the square wave 62.

A peak detector 68 is coupled to the ramp generator 64 and detects the peak amplitude of the saw tooth wave 66. The output of the peak detector 68 is a continuous wave 70 and may be coupled to suitable indicating means such as the meter 18 shown or to a recorder. These may be calibrated to indicate the thickness of a workpiece 12.

It may thus be seen that the present tester 10 permits the two transducers 12 and 14 to be completely isolated from each other whereby the receiver 42 may be made very sensitive without causing it to be blocked by a transmission of a pulse at time $t_1$. However, at the same time an accurate interface reference signal 54 is produced whereby the thickness of very thin members may be measured.

While only a single embodiment of the present invention has been disclosed herein it will be readily apparent to persons skilled in the art that numerous changes and modifications may be made thereto wtihout departing from the spirit of the invention. Accordingly the foregoing disclosure and description thereof are for illustrative purposes only and do not in any way limit the invention which is defined only by the claims which follow.

I claim:

1. An ultrasonic thicknes gauge for measuring the thickness between an entrant surface and a rear surface on a workpiece, said thickness gauge including the combination of
    a search unit adapted to engage the entrant surface,
    a transmitting transducer in said search unit to transmit a pulse of ultrasonic energy through the entrant surface and into the said workpiece for reflection from the rear surface,
    a receiving transducer in said search unit to receive an ultrasonic echo reflected from the rear surface and to produce electrical signals in response thereto,
    said transducers being angularly disposed in said search unit whereby transmitted and received beams overlap each other adjacent said rear surface but not at said entrance surface whereby reception of front surface echoes is avoided,
    said transmitting transducer being positioned a predetermined distance from the entrant surface when the search unit is seated thereon, and
    means responsive to the transmission of the ultrasonic pulses and to said electrical signals, and effective to produce a thickness signal which is a function of a period of time that begins a predetermined interval after said transmission and ends with the echo, said interval being equal to the flight time of the ultrasonic energy across the distance between the transmitting transducer and the entrant surface.

2. An ultrasonic thickness gauge for measuring the thickness between an entrant surface and a rear surface on a workpiece, said thickness gauge including the combination of
    a search unit adapted to engage the entrant surface,
    a transmitting transducer disposed in said search unit to transmit a pulse of ultrasonic energy along a beam pattern extending through the entrant surface and into the said workpiece for reflection from the rear surface,
    a receiving transducer disposed in said search unit to receive ultrasonic energy in a second beam pattern and produce electrical signals in response thereto,
    means effective to position said transducers adjacent each other with the beams angularly disposed so as to overlap each other adjacent said rear surface but not at said entrance surface whereby reception of front surface echoes is avoided, said transmitting transducer being positioned a predetermined distance from the entrant surface when the search unit engages said surface,
    means responsive to the transmission of the ultrasonic energy from the transmitting transducer and effective to produce a reference signal delayed therefrom by an interval equal to the flight time from the transmitting transducer to the entrant surface, and
    means responsive to the reference signal and the echo signal to produce a thickness signal having a magnitude that is a function of the time between the reference signal and echo signal.

3. In the device of claim 1, said means including:
    a pulse generator;
    time delay means connected to said pulse generator to produce an electrical reference signal a fixed interval of time after the pulse of ultrasonic energy is transmitted, and
    a ramp generator coupled to the time delay means responsive to the reference signal, said generator being effective to produce a saw tooth wave that commences simultaneously with the reference signal,
    said ramp generator being responsive to the echo signal to terminate the saw tooth wave simultaneously therewith.

References Cited

UNITED STATES PATENTS

| | | | |
|---|---|---|---|
| 3,006,184 | 10/1961 | Goldman | 73—67.8 |
| 3,041,872 | 7/1962 | Brown et al. | 73—67.9 |
| 3,169,393 | 2/1965 | Stebbins | 73—67.9 |

FOREIGN PATENTS 842,653  7/1960  Great Britain.

RICHARD C. QUEISSER, *Primary Examiner.*

JOHN P. BEAUCHAMP, *Assistant Examiner.*

U.S. Cl. X.R.

73—67.9